(12) United States Patent
Muha et al.

(10) Patent No.: US 11,754,136 B2
(45) Date of Patent: Sep. 12, 2023

(54) ELASTOMERIC COMPRESSION SPRING WITH LOAD TUNING FEATURE AND ASSOCIATED METHOD OF TUNING

(71) Applicant: The Boeing Company, Chicago, IL (US)

(72) Inventors: Nicholas B. Muha, Haddon Township, NJ (US); Jeremie J. Albert, Philadelphia, PA (US); Douglas R. Ludin, Malvern, PA (US)

(73) Assignee: The Boeing Company, Arlington, VA (US)

( * ) Notice: Subject to any disclaimer, the term of this patent is extended or adjusted under 35 U.S.C. 154(b) by 169 days.

(21) Appl. No.: 17/168,596

(22) Filed: Feb. 5, 2021

(65) Prior Publication Data
US 2021/0156443 A1 May 27, 2021

Related U.S. Application Data

(62) Division of application No. 16/028,014, filed on Jul. 5, 2018, now Pat. No. 10,962,073.

(51) Int. Cl.
*F16F 1/373* (2006.01)
*F16F 1/376* (2006.01)
(Continued)

(52) U.S. Cl.
CPC ............ *F16F 1/3732* (2013.01); *F16F 1/376* (2013.01); *F16F 1/377* (2013.01); *F16F 1/44* (2013.01);
(Continued)

(58) Field of Classification Search
CPC .... F16F 1/44; F16F 1/373; F16F 1/376; F16F 1/377; F16F 1/3732; F16F 2228/066;
(Continued)

(56) References Cited

U.S. PATENT DOCUMENTS 3,608,882 A 9/1971 Culp
3,638,985 A 2/1972 Barton et al.
(Continued)

FOREIGN PATENT DOCUMENTS

CN 102897123 1/2013
CN 203362928 12/2013
(Continued)

OTHER PUBLICATIONS

Office Action for Chinese Patent Application No. 201910584103.X dated Aug. 24, 2022.
(Continued)

*Primary Examiner* — Robert A. Siconolfi
*Assistant Examiner* — San M Aung
(74) *Attorney, Agent, or Firm* — Kunzler Bean & Adamson (57) ABSTRACT

An elastomeric compression spring for isolating vibrations between a first part and a second part. The first part is movable in a direction relative to the second part. The elastomeric compression spring comprises a tube elongated along a central axis of the tube. The central axis of the tube is perpendicular to the direction. The tube is configured to compress in the direction. The tube comprises an outer surface comprising an initial contact line configured to initially receive contact from the first part. The tube further comprises at least one load tuning feature in the outer surface, parallel to the central axis, and circumferentially spaced apart from the initial contact line. The at least one load tuning feature creates a localized change in a thickness of the tube and a stiffness of the elastomeric compression spring at the at least one load tuning feature.

20 Claims, 9 Drawing Sheets

(51) Int. Cl.
*F16F 1/377* (2006.01)
*F16F 1/44* (2006.01)

(52) U.S. Cl.
CPC . *F16F 2224/025* (2013.01); *F16F 2230/0005* (2013.01); *F16F 2230/36* (2013.01); *F16F 2232/08* (2013.01); *F16F 2234/02* (2013.01); *F16F 2236/04* (2013.01)

(58) Field of Classification Search
CPC .............. F16F 2228/12; F16F 2230/36; F16F 2230/0005; F16F 2234/02; F16F 2224/025; F16F 2232/08; F16F 2236/04
USPC ...................................................... 267/141.4
See application file for complete search history.

(56) References Cited

U.S. PATENT DOCUMENTS

| | | | |
|---|---|---|---|
| 3,820,495 A | 6/1974 | Ueda | |
| 4,428,568 A * | 1/1984 | McNatt | B66C 7/16 267/140 |
| 5,762,016 A * | 6/1998 | Parsons | E02B 3/26 114/230.26 |
| 5,791,637 A * | 8/1998 | Reichelt | F16F 1/44 267/140 |
| 6,289,836 B1 | 9/2001 | Tellex | |
| 6,364,293 B1 | 4/2002 | Beckett | |
| 6,685,395 B1 * | 2/2004 | Busby | E02B 3/26 405/215 |
| 7,527,454 B1 * | 5/2009 | Brushaber | E02B 3/26 267/140 |
| 2004/0126185 A1 | 7/2004 | Davidson et al. | |
| 2004/0183242 A1 * | 9/2004 | Chase | E02B 3/26 267/141 |
| 2006/0149517 A1 * | 7/2006 | El-Sayed | G06F 30/23 703/7 |
| 2008/0029676 A1 | 2/2008 | Huxtable et al. | |
| 2010/0166502 A1 | 7/2010 | DeMay | |
| 2010/0275702 A1 * | 11/2010 | Kinback | F16K 37/005 251/304 |
| 2015/0152616 A1 * | 6/2015 | Taylor | E02B 3/26 405/212 |
| 2015/0292587 A1 | 10/2015 | Shen | |
| 2016/0227928 A1 | 8/2016 | Smith | |
| 2017/0121923 A1 | 5/2017 | Taylor | |

FOREIGN PATENT DOCUMENTS

| | | |
|---|---|---|
| CN | 103921723 | 7/2014 |
| EP | 0812961 | 12/1997 |
| EP | 2902269 | 8/2015 |
| JP | 58168706 | 10/1983 |
| WO | 8600051 | 1/1986 |
| WO | 2014109923 | 7/2014 |

OTHER PUBLICATIONS

European Search Report for European Patent Application No. 19179916.2 dated Nov. 11, 2019.
European Office Action for European Patent Application No. 19179916.2 dated Oct. 29, 2019.
Office Action for Chinese Patent Application No. 201910584103.X dated Mar. 24, 2022.
Office Action for Chinese Patent Application No. 201910584103.X dated Jan. 9, 2023.
Office Action for EP Patent Application No. 19179916.2 dated Jul. 7, 2023.

* cited by examiner

ELASTOMERIC COMPRESSION SPRING WITH LOAD TUNING FEATURE AND ASSOCIATED METHOD OF TUNING

FIELD

This disclosure relates generally to vibration isolators, and more particularly to elastomeric compression springs.

BACKGROUND

Elastomeric compression springs are used to isolate vibrations in some applications. Such elastomeric compression springs are configured to isolate vibrations according to the load-displacement performance and frequency response of the elastomeric compression springs. Manufacturing an elastomeric compression spring to achieve a particular load-displacement performance, without excessive trial-and-error iterations, can be difficult.

SUMMARY

The subject matter of the present application has been developed in response to the present state of the art, and in particular, in response to the shortcomings of elastomeric compression springs and associated methods of manufacture, that have not yet been fully solved by currently available techniques. Accordingly, the subject matter of the present application has been developed to provide examples of an elastomeric compression spring and associated methods of manufacturing the elastomeric compression spring that overcome at least some of the above-discussed shortcomings of prior art techniques.

Disclosed herein is an elastomeric compression spring for isolating vibrations between a first part and a second part. The first part is movable in a direction relative to the second part. The elastomeric compression spring comprises a tube elongated along a central axis of the tube. The central axis of the tube is perpendicular to the direction. The tube is configured to compress in the direction. The tube comprises an outer surface comprising an initial contact line configured to initially receive contact from the first part. The tube further comprises at least one groove formed in the outer surface, parallel to the central axis, and circumferentially spaced apart from the initial contact line. The at least one groove creates a localized reduction in a thickness of the tube and a stiffness of the elastomeric compression spring at the at least one groove. The preceding subject matter of this paragraph characterizes example 1 of the present disclosure.

The tube further comprises two grooves formed in the outer surface of the tube on opposite sides of the initial contact line. The preceding subject matter of this paragraph characterizes example 2 of the present disclosure, wherein example 2 also includes the subject matter according to example 1, above.

The two grooves are circumferentially spaced a same distance from the initial contact line. The preceding subject matter of this paragraph characterizes example 3 of the present disclosure, wherein example 3 also includes the subject matter according to example 2, above.

The tube further comprises four grooves formed in the outer surface of the tube. Two of the four grooves are on a side of the initial contact line opposite that of the other two of the four grooves. The preceding subject matter of this paragraph characterizes example 4 of the present disclosure, wherein example 4 also includes the subject matter according to any one of examples or 2 or 3, above.

The outer surface of the tube has a curved convex shape. The at least one groove has a curved concave shape. The preceding subject matter of this paragraph characterizes example 5 of the present disclosure, wherein example 5 also includes the subject matter according to any one of examples 1-4, above.

The tube is made of a thermoplastic elastomer. The preceding subject matter of this paragraph characterizes example 6 of the present disclosure, wherein example 6 also includes the subject matter according to any one of examples 1-5, above.

The thickness of the tube, when moving along the tube in a circumferential direction toward the initial contact line, decreases and increases along the at least one groove. The preceding subject matter of this paragraph characterizes example 7 of the present disclosure, wherein example 7 also includes the subject matter according to any one of examples 1-6, above.

A depth of the at least one groove corresponds with a magnitude of decrease in a load-displacement rate of the elastomeric compression spring. A length of the at least one groove corresponds with a range of displacement of the tube during which the load-displacement rate decreases. A circumferential distance of the at least one groove away from the initial contact line corresponds with a displacement of the tube at which the decrease in the load-displacement rate of the elastomeric compression spring begins. The preceding subject matter of this paragraph characterizes example 8 of the present disclosure, wherein example 8 also includes the subject matter according to any one of examples 1-7, above.

Also disclosed herein is an elastomeric compression spring for isolating vibrations between a first part and a second part. The first part is movable in a direction relative to the second part. The elastomeric compression spring includes a tube elongated along a central axis of the tube. The central axis of the tube is perpendicular to the direction. The tube is configured to compress in the direction. The tube comprises an outer surface comprising an initial contact line configured to initially receive contact from the first part. The tube further comprises at least one rib formed in the outer surface, parallel to the central axis, and circumferentially spaced apart from the initial contact line. The at least one rib creates a localized increase in a thickness of the tube and a stiffness of the elastomeric compression spring at the at least one rib. The preceding subject matter of this paragraph characterizes example 9 of the present disclosure.

The tube further comprises two ribs formed in the outer surface of the tube on opposite sides of the initial contact line. The preceding subject matter of this paragraph characterizes example 10 of the present disclosure, wherein example 10 also includes the subject matter according to example 9, above.

The two ribs are circumferentially spaced a same distance from the initial contact line. The preceding subject matter of this paragraph characterizes example 11 of the present disclosure, wherein example 11 also includes the subject matter according to example 10, above.

The tube further comprises four ribs formed in the outer surface of the tube. Two of the four ribs are on a side of the initial contact line opposite that of the other two of the four ribs. The preceding subject matter of this paragraph characterizes example 12 of the present disclosure, wherein example 12 also includes the subject matter according to any one of examples 10 or 11, above.

The outer surface of the tube has a curved convex shape. The at least one rib has a curved convex shape with a radius of curvature less than that of the curved convex shape of the outer surface of the tube. The preceding subject matter of this paragraph characterizes example 13 of the present disclosure, wherein example 13 also includes the subject matter according to any one of examples 9-12, above.

The tube is made of a thermoplastic elastomer. The preceding subject matter of this paragraph characterizes example 14 of the present disclosure, wherein example 14 also includes the subject matter according to any one of examples 9-13, above.

The thickness of the tube, when moving along the tube in a circumferential direction toward the initial contact line, increases and decreases along the at least one rib. The preceding subject matter of this paragraph characterizes example 15 of the present disclosure, wherein example 15 also includes the subject matter according to any one of examples 9-14, above.

A height of the at least one rib corresponds with a magnitude of increase in a load-displacement rate of the elastomeric compression spring. A length of the at least one rib corresponds with a range of displacement of the tube during which the load-displacement rate is increased. A circumferential distance of the at least one rib away from the initial contact line corresponds with a displacement of the tube at which the increase in the load-displacement rate of the elastomeric compression spring begins. The preceding subject matter of this paragraph characterizes example 16 of the present disclosure, wherein example 16 also includes the subject matter according to any one of examples 9-15, above.

Additionally disclosed herein is a method of tuning an elastomeric compression spring. The method comprises identifying at least one difference between a desired load-displacement performance and an actual load-displacement performance of an elastomeric compression spring. The method also comprises determining a desired localized decrease in a load-displacement rate beginning at a desired first displacement and ending at a desired second displacement corresponding with the at least one difference between the desired load-displacement performance and the actual load-displacement performance. The method further comprises updating at least one groove formed in an outer surface of a tube of the elastomeric compression spring, according to the desired localized decrease in the load-displacement rate, to achieve the desired load-displacement performance. The preceding subject matter of this paragraph characterizes example 17 of the present disclosure.

The elastomeric compression spring is updated such that a depth of the at least one groove corresponds with a magnitude of the desired localized decrease in the load-displacement rate, a circumferential distance of the at least one groove away from an initial contact line of the tube corresponds with the desired first displacement, and a length of the at least one groove corresponds with the desired second displacement. The preceding subject matter of this paragraph characterizes example 18 of the present disclosure, wherein example 18 also includes the subject matter according to example 17, above.

Also disclosed herein is a method of tuning an elastomeric compression spring. The method comprises identifying at least one difference between a desired load-displacement performance and an actual load-displacement performance of an elastomeric compression spring. The method also comprises determining a desired localized increase in a load-displacement rate beginning at a desired first displacement and ending at a desired second displacement corresponding with the at least one difference between the desired load-displacement performance and the actual load-displacement performance. The method further comprises updating at least one rib formed in an outer surface of a tube of the elastomeric compression spring, according to the desired localized increase in the load-displacement rate, to achieve the desired load-displacement performance. The preceding subject matter of this paragraph characterizes example 19 of the present disclosure.

The elastomeric compression spring is updated such that a height of the at least one rib corresponds with a magnitude of the desired localized increase in the load-displacement rate, a circumferential distance of the at least one rib away from an initial contact line of the tube corresponds with the desired first displacement, and a length of the at least one rib corresponds with the desired second displacement. The preceding subject matter of this paragraph characterizes example 20 of the present disclosure, wherein example 20 also includes the subject matter according to example 19, above.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
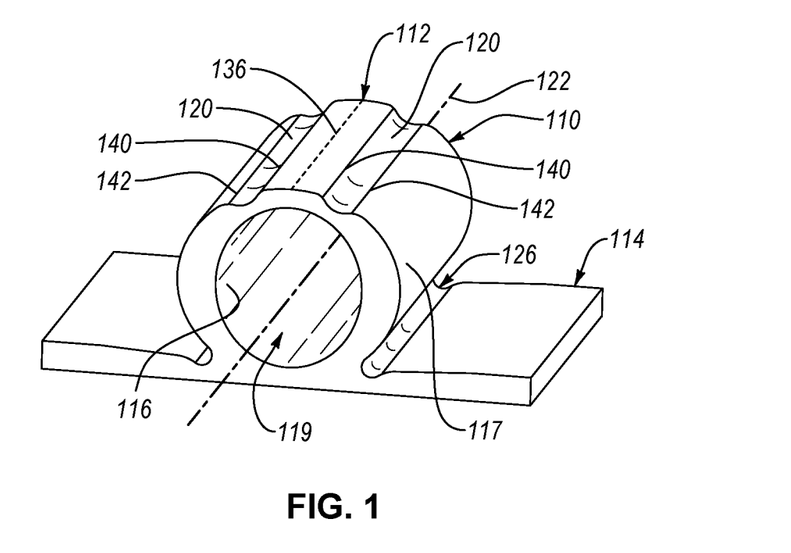
FIG. 1 is a perspective view of an elastomeric compression spring, according to one or more examples of the present disclosure.
Figure 2:
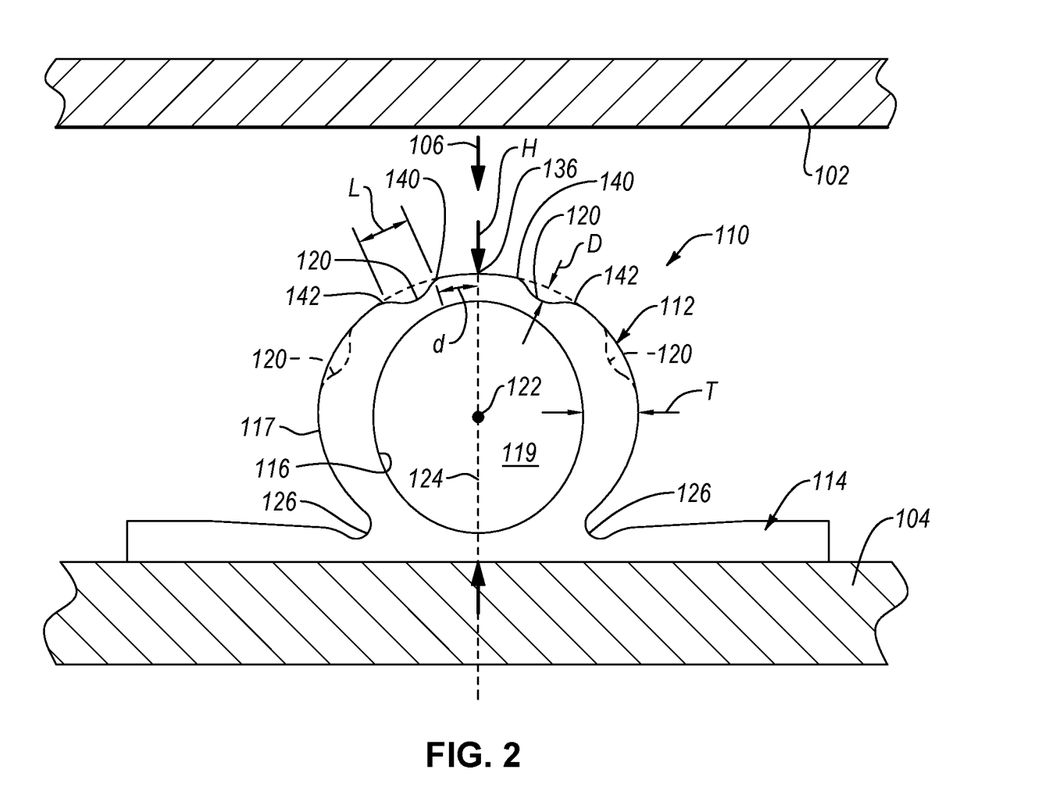
FIG. 2 is a front elevation view of the elastomeric compression spring of FIG. 1 between two parts, according to one or more examples of the present disclosure.

Referring to FIGS. 1 and 2, an elastomeric compression spring 110, according to one example, is shown. The elastomeric compression spring 110 is configured to isolate vibrations between a first part 102 and a second part 104 (see, e.g., FIG. 2). As defined herein, a vibration is defined as relative movement between two parts. The first part 102 is movable relative to the second part 104 in a direction 106. In some implementations, movement of the first part 102 relative to the second part 104 (also defined as movement of the second part 104 relative to the first part 102) can be intentional or controllable movement, such as the opening and closing of a door relative to a frame. However, in other implementations, movement of the first part 102 relative to the second part 104 can be unintentional or uncontrollable, such as vibrations between an engine and a frame caused by normal operation of the engine. The elastomeric compression spring 110 isolates vibrations, or relative movement, between the first part 102 and the second part 104. Moreover, the vibration isolation characteristics of the elastomeric compression spring 110 are tunable (e.g., customizable) to predictably achieve a desired load-displacement and/or frequency performance based on an intended use of the elastomeric compression spring 110.

The elastomeric compression spring 110 includes a base 114 and a tube 112 coupled to the base 114. The base 114 provides a platform on which the tube 112 is supported. Generally, the base 114 is configured to fixedly engage the second part 104 such that the tube 112 is fixedly engaged with the second part 104 and interposed between the first part 102 and the second part 104. The base 114 can be fixedly engaged with the second part 104 in various ways. For example, the base 114 can be adhered to, bonded to, fastened to, interference fitted to, and/or interlocked with the second part 104. The base 114 may have an engagement surface configured to complementary engage a corresponding surface of the second part 104. In the illustrated example, the base 114 has a flat surface that engages a flat surface of the second part 104. Although the base 114 can have any of various shapes and sizes capable of anchoring the tube 112 relative to the second part 104, in the illustrated example, the base 114 has a thin-walled rectangular shape and a footprint greater than that of the tube 112. In some examples, the elastomeric compression spring 110 does not include a base 114 (e.g., the tube 112 can be attached direction to the second part 104).

The tube 112 protrudes away from the base 114 such that, when the base 114 is engaged with the second part 104, the tube 112 is interposed between the base 114 and the first part 102. Generally, the tube 112 is defined as a circumferentially closed sidewall. The tube 112 defines a central axis 122 along which the tube 112 is elongated. The central axis 122 is a geometric center of the tube 112 in some examples. As defined herein, the tube 112 is hollow, which facilitates compression of the tube 112. Accordingly, the tube 112 includes a hollow interior channel 119 that extends the length of the tube 112 along the central axis 122. The tube 112 includes an inner surface 116 and an outer surface 117. The inner surface 116 faces towards the central axis 122 while the outer surface 117 faces away from the central axis 122. Correspondingly, the inner surface 116 is concave and the outer surface 117 is convex. The inner surface 116 defines the hollow interior channel 119.

Although the tube 112 in the illustrated examples is a hollow elongate tube, in other examples, the tube 112 can have a hollow spherical shape. The hollow spherically-shaped tube could have the same cross-sectional shape as that of the hollow elongate tube. However, the cross-sectional shape of the hollow spherically-shaped tube would revolve 360-degrees, instead of linearly along an axis. One or more grooves 120 or ribs 150, as described below, would extend continuously or discontinuously circumferentially about the hollow spherical shape.

The tube 112 has a thickness (T) defined as the minimum distance between the inner surface 116 and the outer surface 117 at any point around the tube 112. In some examples, the thickness (T) is more particularly defined as the distance between the inner surface 116 and the outer surface 117 in a direction radially away from the central axis 122. The thickness (T) of the tube 112 can vary at different locations circumferentially along the tube 112. In other words, when moving along the tube 112 in a circumferential direction, the thickness (T) of the tube 112 can vary.

The thickness (T) of the tube 112 is related to the stiffness of the tube 112. In other words, for a given material, the thicker the tube 112, then the stiffer the tube 112. Moreover, the stiffness of the tube 112 affects the vibration isolation characteristics. More specifically, the stiffness of the tube 112 affects the load-displacement performance of the elastomeric compression spring 110. For example, the stiffer the tube 112, then the higher the load for a given displacement of the elastomeric compression spring 110. In contrast, the more flexible the tube 112, the lower the load for a given displacement of the elastomeric compression spring 110. Accordingly, the load-displacement performance of the elastomeric compression spring 110 is a measure of the compression resistance force (e.g., load) generated by the elastomeric compression spring 110 for a given compressive displacement (e.g., compression) of the spring 110.

Generally, as the elastomeric compression spring 110 is compressed, the compression resistance force or load generated by the elastomeric compression spring 110 increases. In some examples, the load-displacement rate (e.g., the rate at which the load of the elastomeric compression spring 110 changes as the elastomeric compression spring 110 is compressed) also increases as the elastomeric compression spring 110 is further compressed. Referring to the chart 170 and the chart 180 FIGS. 10 and 11, respectively, according to one example, a load-displacement rate represented by a load-displacement curve 172 for the elastomeric compression spring 110, without grooves 120, is shown to continuously increase with continuous compressive displacement. Accordingly, the load-displacement curve 172 is non-linear or curved. In some implementations, the load-displacement curve 172 is considered a fully exponential curve or the load and displacement of the elastomeric compression spring 110 without grooves 120 are fully exponentially related.

In some applications, it may be desirable for an elastomeric compression spring to have a load-displacement rate that does not continuously increase. For example, in certain instances, an elastomeric compression spring with a load-displacement rate that decreases within a desired displacement range of the compression spring may be desirable. In other words, it may be desirable to have an elastomeric compression spring where the load and displacement are only partially exponentially related. To promote a decrease in the load-displacement rate within a desired displacement range, the tube 112 of the elastomeric compression spring 110 includes at least one groove 120 formed in the outer surface 117 of the tube 112. As will be described in more detail, the groove 120 creates a localized reduction in the thickness (T) of the tube 112, which causes a localized reduction in the stiffness of the elastomeric compression spring 110 at the groove 120.

The tube 112 further includes an initial contact line 136, which is a hypothetical or virtual line. The initial contact line 136 represents the portion of the outer surface 117 that initially contacts the first part 102 as the first part 102 moves toward the second part 104 in the direction 106. Accordingly, the elastomeric compression spring 110 is fixedly coupled to the second part 104 and oriented such that the initial contact line 136 initially receives the first part 102. In some implementations, movement of the first part 102 relative to the second part 104 begins with the first part 102 in contact with the initial contact line 136 of the tube 112. In other implementations, the first part 102 is moved into contact with the initial contact line 136 of the tube 112. The groove 120 is formed into the outer surface 117 of the tube 112 at a location that is circumferentially spaced apart from the initial contact line 136. As defined herein, circumferential spacing or a circumferential distance refers to a spacing or distance along an outer periphery of the tube 112 in a direction perpendicular to the central axis 122 and does not necessarily imply the tube 112 is cross-sectionally circular, as the tube 112 may a cross-sectional shape other than circular, such as ovular, triangular, rectangular, oblong, and the like.

The groove 120 is elongated and extends parallel to the central axis 122 (see, e.g., FIG. 1). In cross-section, as shown in FIG. 2, the groove 120 is concave and thus effectually defines a concave outer surface of the tube 112. In the illustrated example, the groove 120 has a curved concave shape with constant radius of curvature. However, in other examples, the groove 120 can have a non-curved concave shape, such as a polygonal shape, or a curved concave shape with a changing radius of curvature.

The groove 120 has a depth (D) equal to the distance between a bottommost point of the groove 120 and the hypothetical continuation of the curvature of the outer surface 117 of the tube 112 over the groove 120, as shown in dashed line in FIG. 2. Because the groove 120 effectually reduces the amount of material of the tube 112, the thickness (T) of the tube 112 at the groove 120 is less than at other non-grooved portions of the tube 112. Additionally, because the groove 120 is concave, the thickness (T) of the tube 112, when moving along the tube 112 in a circumferential direction toward the initial contact line 136 decreases and then increases along the groove 120 (e.g., along the portion of the tube 112 defined by the groove 120).

Additionally, the groove 120 also has a length (L) equal to the distance between a leading edge 140 of the groove 120 and a trailing edge 142 of the groove 120. The length (L) can be considered a circumferential length in some implementations.

Moreover, the groove 120 is located on the outer surface 117 of the tube 112 a circumferential distance (d) away from the initial contact line 136. More specifically, the leading edge 140 of the groove 120 is a circumferential distance (d) away from the initial contact line 136 and the trailing edge 142 is the circumferential distance (d) plus the length (L) of the groove 120 away from the initial contact line 136. The circumferential distance (d) is less than half the circumference or perimeter of a corresponding side of the tube 112 in some implementations. In other words, the groove 120 is located on an upper half of the tube 112.

In the illustrated example, the tube 112 of the elastomeric compression spring 110 has two grooves 120 formed in the outer surface 117 on opposite sides of the initial contact line 136. In one implementation, the two grooves 120 are circumferentially spaced the same distance from the initial contact line 136. In other words, the circumferential distance (d) for both grooves 120 is the same. Additionally, the grooves 120 can be identically sized and shaped such that one side of the tube 112 is a mirror image of the other side of the tube 112. In other words, the tube 112 is symmetrical across a plane of symmetry 124 aligned with the initial contact line 136.

Although the tube 112 of the illustrated example includes just two grooves 120, in other examples, the tube 112 can include more than two grooves 120, such as four grooves 120. The tube 112 of FIG. 2 is shown optionally to have two additional groove 120 formed in the outer surface 117 with each groove 120 on an opposite side of the initial contact line 136. The two additional grooves 120 can be spaced the same circumferential distance from the initial contact line 136 and the same circumferential distance away from the corresponding adjacent groove 120. In yet other examples, the tube 112 may have more than four grooves 120.

The tube 112 can be made of any of various elastomeric (e.g., resiliently flexible) materials in some examples. In one example, the tube 112 is made of a thermoplastic elastomer.

In another example, the tube 112 is made of a rubber. The base 114 is made of the same material as the tube 112 in one example and made of a different material, such as a non-elastomeric material or a different elastomeric material, in another example. In other examples, the tube 112 could be made of a metallic material, such as for a one-time use (e.g., a crush feature) or only used in the elastic strain regime of the material (e.g., for small deformations).

The tube 112 and the base 114 be co-formed together to collectively form a one-piece, seamless monolithic construction. However, in other implementations, the tube 112 and the base 114 are formed separately and attached together. According to one example, the tube 112 and/or the base 114 is formed by extruding a thermoplastic elastomer through a die so as to form a continuous length of the tube 112 and/or the base 114.

In one example, the elastomeric compression spring 110 includes a radiused portion 126 at each of the intersections between the tube 112 and the base 114. The radiused portion 126 promotes deformity (e.g., compression) of the tube 112 relative to the base 114, particularly the portion of the tube 112 directly adjacent the base 114.

Operation of the elastomeric compression spring 110 of FIGS. 1 and 2 as a vibration isolator will now be described. After the first part 102 is in contact with the initial contact line 136 of the tube 112, further movement of the first part 102 relative to the second part 104, in the direction 106, compresses (e.g., resiliently deforms) the elastomeric compression spring 110. Compression of the elastomeric compression spring 110 changes a height (H) of the elastomeric compression spring 110. The height (H) of the elastomeric compression spring 110 is defined as the distance between the initial contact line 136 and the engagement surface of the base 114 or the bottom of the tube 112.

Figure 3:
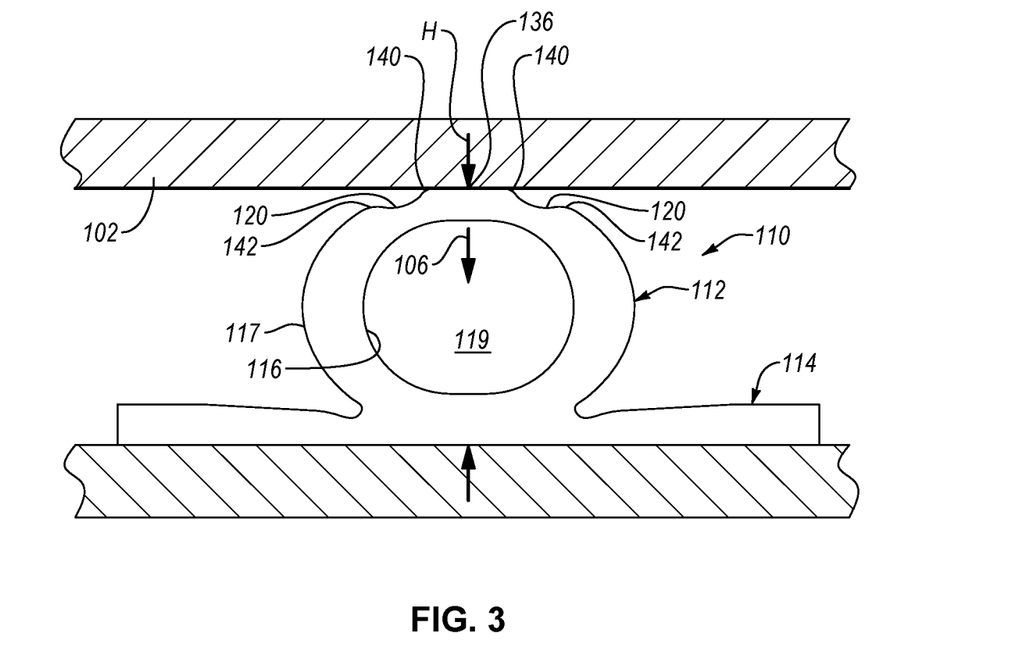
FIG. 3 is a front elevation view of the elastomeric compression spring of FIG. 1, shown compressed between two parts, according to one or more examples of the present disclosure.
Figure 4:
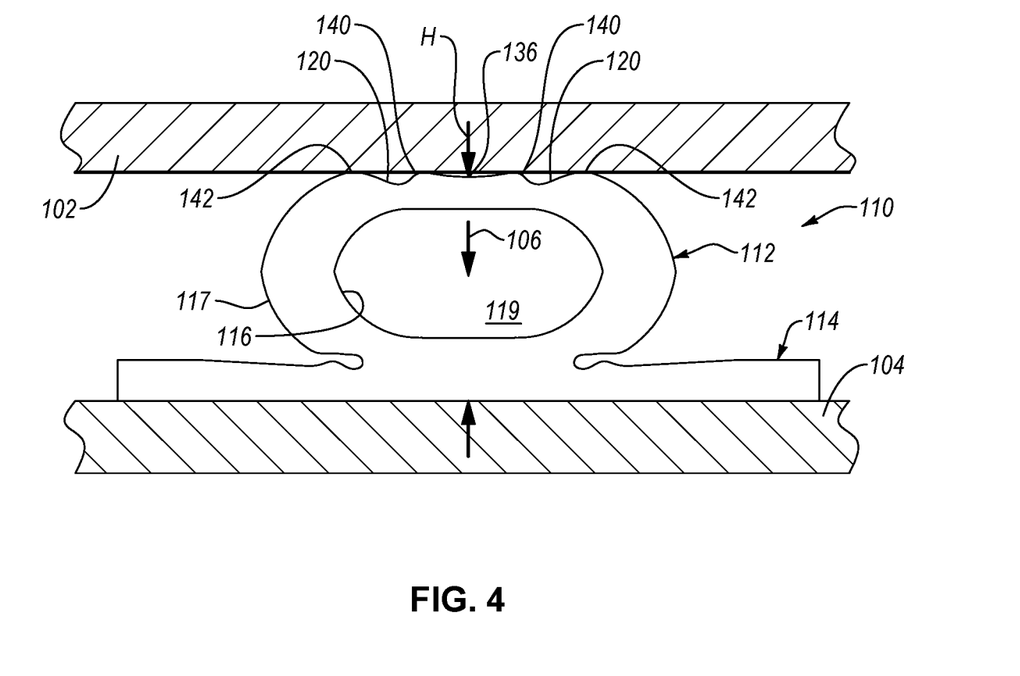
FIG. 4 is a front elevation view of the elastomeric compression spring of FIG. 1, shown compressed between two parts, according to one or more examples of the present disclosure.
Figure 10:
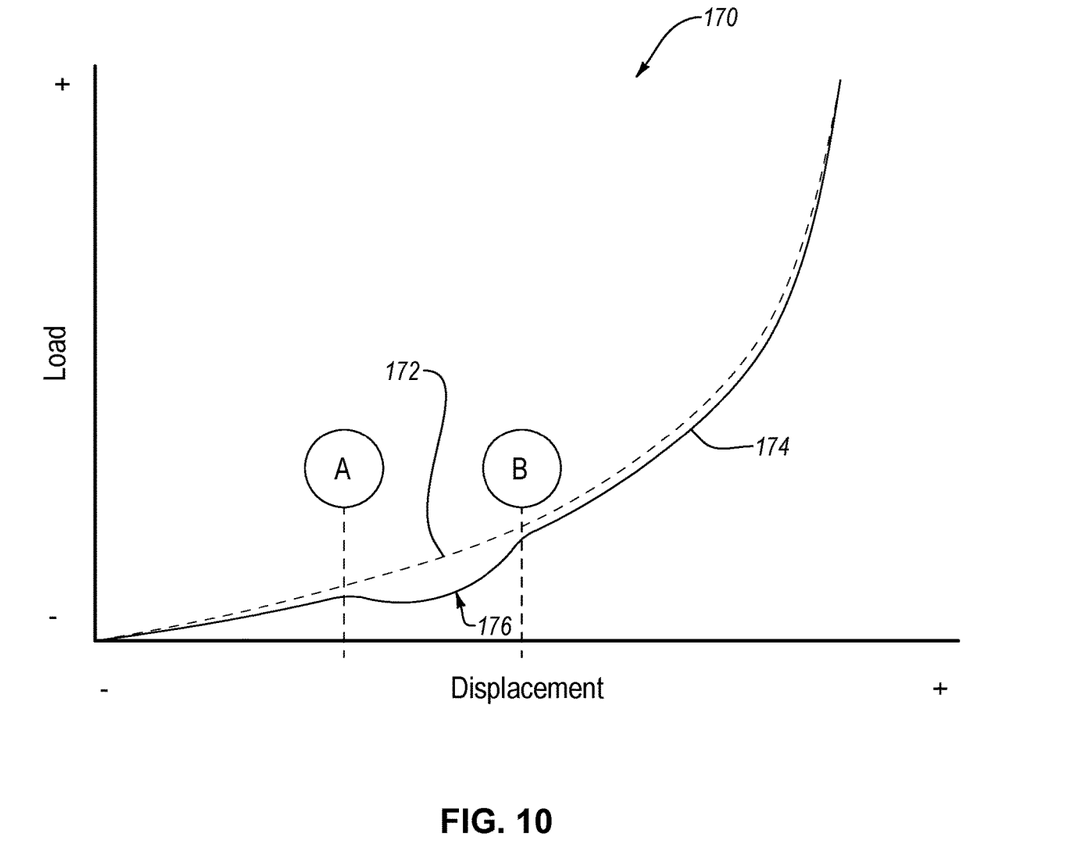
FIG. 10 is a chart showing a load-displacement performance of the elastomeric compression spring of FIG. 1, according to one or more examples of the present disclosure.
Figure 11:
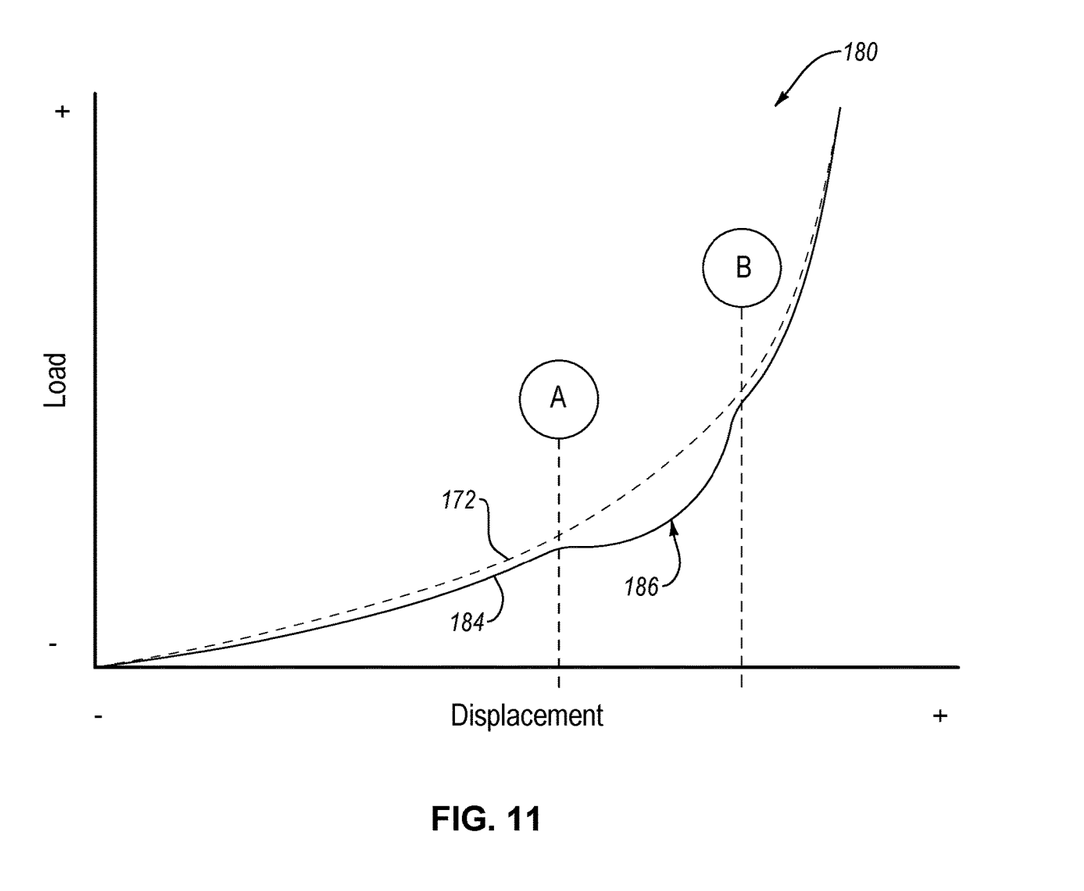
FIG. 11 is a chart showing a load-displacement performance of the elastomeric compression spring of FIG. 5, according to one or more examples of the present disclosure.

As indicated by the load-displacement curve 174 of the chart 170 of FIG. 10, as the elastomeric compression spring 110 of FIGS. 1 and 2 is compressed (e.g., displaced), the compression resistance load generated by the elastomeric compression spring 110 increases at a fairly constant rate. However, as shown in FIG. 3, once the elastomeric compression spring 110 is sufficiently compressed (i.e., at displacement A of FIG. 10), such that the first part 102 comes in contact with the leading edges 140 of the grooves 120, the load-displacement rate begins to decrease, due to the decreasing thickness (T) of the tube 112 along a first portion of the grooves 120. The load-displacement rate continuously decreases under further compression of the elastomeric compression spring 110 until the displacement of the elastomeric compression spring 110 reaches some point (e.g., midpoint) between the displacement A and a displacement B, at which time the load-displacement rate starts to increase.

Displacement B corresponds with the displacement of the elastomeric compression spring 110 where the first part 102 comes in contact with the trailing edges 142 of the grooves 120. The region of the load-displacement curve 174 between the displacement A and the displacement B is defined as a localized load-displacement reduction region 176. At displacement B, the load-displacement curve 174 starts to align with the load-displacement curve 172 of the elastomeric compression spring 110 without the grooves 120. Accordingly, the localized load-displacement reduction region 176 acts a localized departure from the load-displacement curve 172.

The characteristics of the localized load-displacement reduction region 176 are based on the configuration of the grooves 120. For example, the depth (D) of the grooves 120 corresponds with a magnitude of decrease in the load-displacement rate of the elastomeric compression spring 110 within the localized load-displacement reduction region 176. The circumferential distance (d) of the grooves 120 away from the initial contact line 136 corresponds with the displacement of the tube 112 at which the decrease in the load-displacement rate of the elastomeric compression spring 110 begins. In other words, the circumferential distance (d) of the grooves 120 away from the initial contact line 136 corresponds with displacement A of the load-displacement curve 174. The length (L) of the grooves 120 corresponds with the range of displacement of the tube 112 during which the load-displacement rate decreases and departs from the load-displacement curve 172. Accordingly, the length (L) corresponds with displacement B of the load-displacement curve 174.

Figure 5:
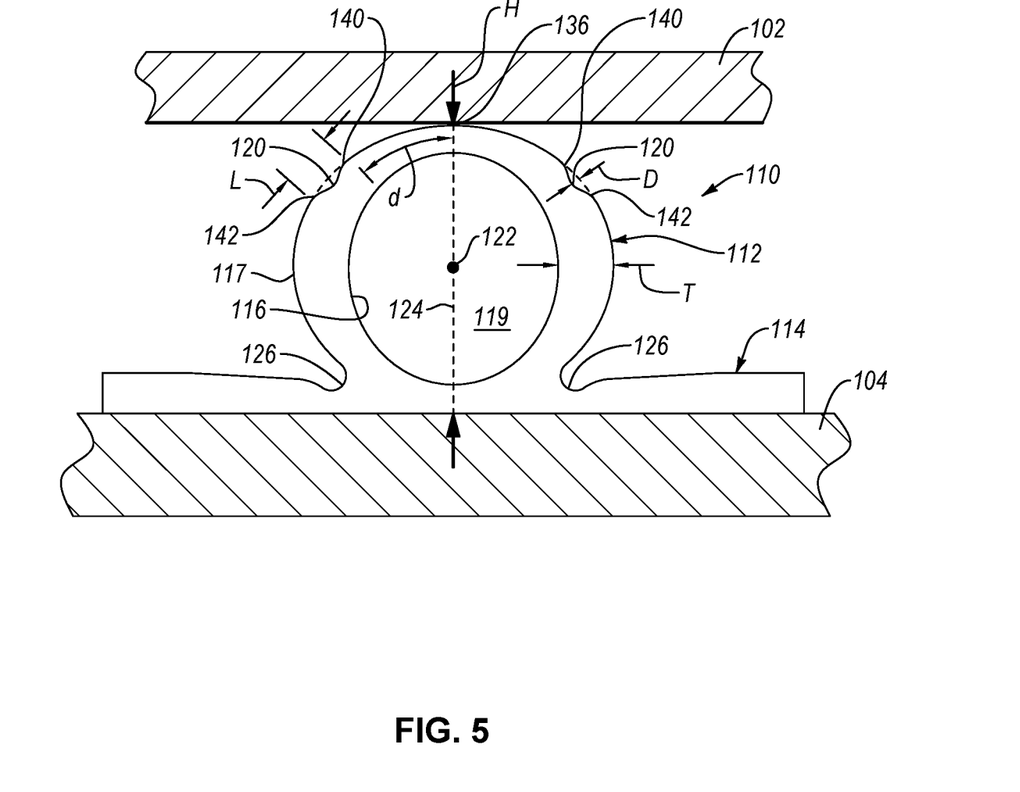
FIG. 5 is a front elevation view of an elastomeric compression spring between two parts, according to one or more examples of the present disclosure.
Figure 6:
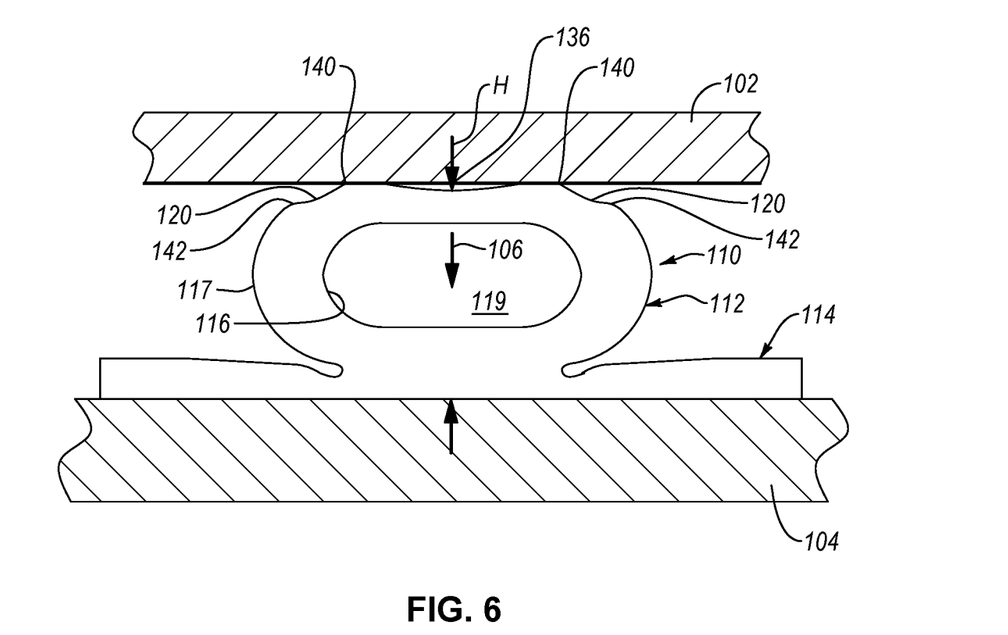
FIG. 6 is a front elevation view of the elastomeric compression spring of FIG. 5, shown compressed between the two parts, according to one or more examples of the present disclosure.
Figure 7:
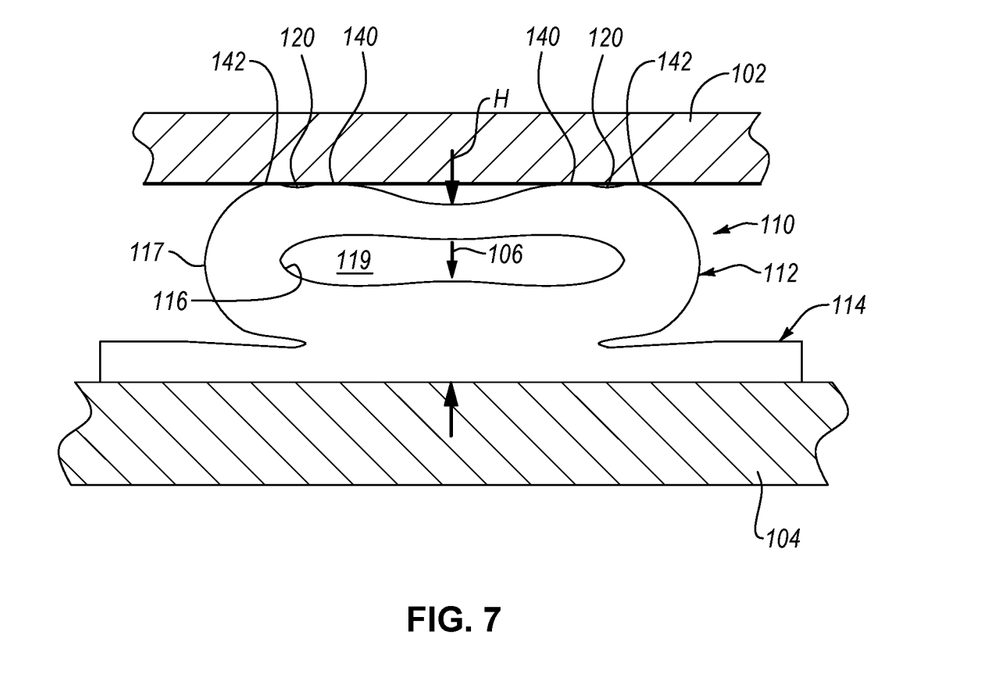
FIG. 7 is a front elevation view of the elastomeric compression spring of FIG. 5, shown compressed between the two parts, according to one or more examples of the present disclosure.

Any one of the characteristics of the grooves 120 can be modified to predictably and precisely adjust the characteristics of the load-displacement behavior of the elastomeric compression spring 110. For example, referring to FIGS. 5-7, if an elastomeric compression spring 110, having a localized load-displacement reduction region that occurs at a greater displacement of the elastomeric compression spring 110 than the localized load-displacement reduction region 176, is desired, the grooves 120 can be located a greater circumferential distance (d) away from the initial contact line 136. The circumferential distance (d) of the grooves 120 of the elastomeric compression spring 110 of FIG. 5 is greater than that of the elastomeric compression spring 110 of FIG. 1. Accordingly, as the elastomeric compression spring 110 of FIG. 5 is compressed (see, e.g., FIGS. 6 and 7), the localized load-displacement reduction region 186 of the resultant load-displacement curve 184 shown in the chart 180 of FIG. 11 starts when the elastomeric compression spring 110 is more displaced (e.g., compressed) compared to the elastomeric compression spring 110 of FIG. 1. Although not shown, the grooves 120 of the elastomeric compression spring 110 of FIG. 5 could be wider or narrower (e.g., longer or shorter length (L)) and/or deeper or shallower (e.g., greater or lesser depth (D)) to change the duration and/or magnitude of the localized load-displacement reduction region 186 compared to the localized load-displacement reduction region 176.

The direct correlation between the characteristics of the grooves 120 and the characteristics of the localized load-displacement reduction region 176 allows the grooves 120 to be pre-designed and manufactured to predictably and precisely tune the load-displacement behavior of an elastomeric compression spring 110 to achieve a load-displacement reduction region 176 with desired characteristics, including a desired location, magnitude, and duration. Accordingly, as described in more detail below in association with the method 200 of FIG. 13, an elastomeric compression spring 110 can be designed and made to achieve unique and predetermined load-displacement behavior in a way that promotes a reduction in design and manufacturing iterations, which helps to increase efficiency, promote cost savings, and reduce labor.

In some applications and contexts, it may be desirable for an elastomeric compression spring to produce a load-displacement curve with a localized load-displacement increase region, within which a load-displacement rate substantially sharply increases, to promote added stiffness across a range of displacement of the elastomeric compression spring. Accordingly, instead of, or in addition to, grooves, an elastomeric compression spring can include ribs that generate a localized load-displacement increase region. For example, referring to FIGS. 8 and 9, to promote a sharp increase, or increase bump, in the load-displacement rate within a desired displacement range, the tube 112 of the elastomeric compression spring 110 includes at least one rib 150 formed in the outer surface 117 of the tube 112. As will be described in more detail, the rib 150 creates a localized increase in the thickness (T) of the tube 112, which causes a localized increase in the stiffness of the elastomeric compression spring 110 at the rib 150.

The rib 150 is formed into the outer surface 117 of the tube 112 at a location that is circumferentially spaced apart from the initial contact line 136. With the exception of ribs 150 instead of grooves 120, in some examples, the elastomeric compression spring 110 of FIGS. 8 and 9 can have the same features and configuration as the above-described features and configuration of the elastomeric compression spring 110 of FIGS. 1 and 2.

Figure 8:
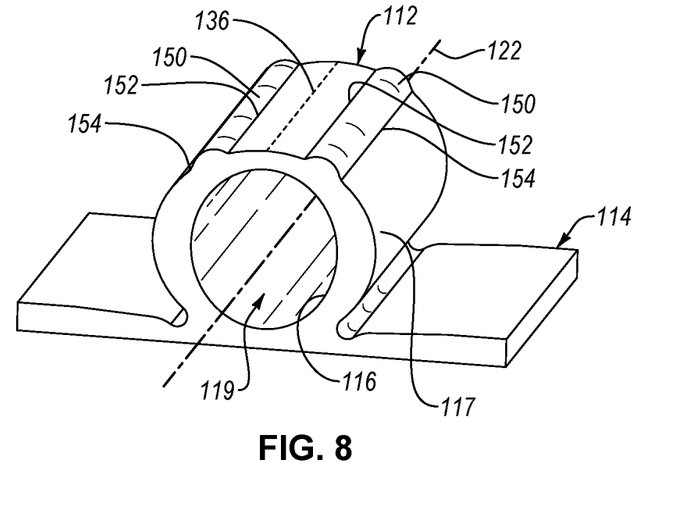
FIG. 8 is a perspective view of an elastomeric compression spring, according to one or more examples of the present disclosure.
Figure 9:
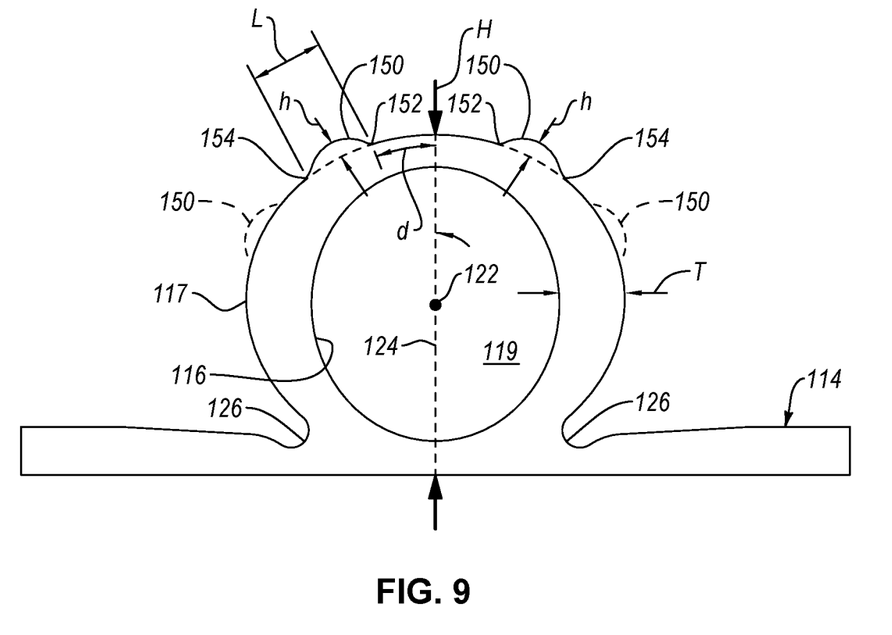
FIG. 9 is a front elevation view of the elastomeric compression spring of FIG. 8 between two parts, according to one or more examples of the present disclosure.

The rib 150 is elongated and extends parallel to the central axis 122 (see, e.g., FIG. 8). In cross-section, as shown in FIG. 9, the rib 150 is convex and thus effectually defines a convex outer surface of the tube 112. In the illustrated example, the rib 150 has a curved concave shape with constant radius of curvature. However, in other examples, the rib 150 can have a non-curved concave shape, such as a polygonal shape, or a curved concave shape with a changing radius of curvature. The radius of curvature of the rib 150 is less than the radius of curvature of the outer surface 117 of the tube 112. Accordingly, the rib 150 protrudes from the outer surface 117 of the tube 112.

The rib 150 has a height (h) equal to the distance between a crest or apex of the rib 150 and the hypothetical continuation of the curvature of the outer surface 117 of the tube 112 over the groove 120, as shown in dashed line in FIG. 9. Because the rib 150 effectually increases the amount of material of the tube 112, the thickness (T) of the tube 112 at the rib 150 is more than at other non-ribbed portions of the tube 112, such as those portions directly adjacent the rib 150. Additionally, because the rib 150 is convex, the thickness (T) of the tube 112, when moving along the tube 112 in a circumferential direction toward the initial contact line 136 increases and then decreases along the rib 150 (e.g., along the portion of the tube 112 defined by the rib 150).

Additionally, the rib 150 also has a length (L) equal to the distance between a leading edge 152 of the rib 150 and a trailing edge 154 of the rib 150. The length (L) can be considered a circumferential length in some implementations.

Moreover, the rib 150 is located on the outer surface 117 of the tube 112 a circumferential distance (d) away from the initial contact line 136. More specifically, the leading edge 152 of the rib 150 is a circumferential distance (d) away from the initial contact line 136 and the trailing edge 154 is the circumferential distance (d) plus the length (L) of the rib 150 away from the initial contact line 136.

In the illustrated example, the tube 112 of the elastomeric compression spring 110 has two ribs 150 formed in the outer surface 117 on opposite sides of the initial contact line 136. In one implementation, the two ribs 150 are circumferentially spaced the same distance from the initial contact line 136. In other words, the circumferential distance (d) for both ribs 150 is the same. Additionally, the ribs 150 can be identically sized and shaped such that one side of the tube 112 is a mirror image of the other side of the tube 112.

Although the tube 112 of the illustrated example includes just two ribs 150, in other examples, the tube 112 can include more than two ribs 150, such as four ribs 150. The tube 112 of FIG. 2 is shown optionally to have two additional ribs 150 formed in the outer surface 117 with each rib 150 on an opposite side of the initial contact line 136. The two additional ribs 150 can be spaced the same circumferential distance from the initial contact line 136 and the same circumferential distance away from the corresponding adjacent rib 150. In yet other examples, the tube 112 may have more than four ribs 150. Additionally, although not shown, in certain examples, the tube 112 can have two or more grooves 120 and two or more ribs 150 to provide an elastomeric compression spring 110 that has both a bump decrease and a bump increase in its load-displacement rate.

Operation of the elastomeric compression spring 110 of FIGS. 8 and 9 as a vibration isolator will now be described. After a first part (e.g., a part similar to the first part 102 of FIG. 2 and movable into contact with the elastomeric compression spring 110) is in contact with the initial contact line 136 of the tube 112, further movement of the first part relative to a second part (e.g., a part similar to the second part 104 of FIG. 2 and supporting the elastomeric compression spring 110), in the direction 106, compresses (e.g., resiliently deforms) the elastomeric compression spring 110. As indicated by the load-displacement curve 194 of the chart 190 of FIG. 12, as the elastomeric compression spring 110 of FIGS. 8 and 9 is compressed (e.g., displaced), the compression resistance load generated by the elastomeric compression spring 110 increases at a fairly constant rate. However, once the elastomeric compression spring 110 is sufficiently compressed (i.e., at displacement A of FIG. 12), such that the first part comes in contact with the leading edges 152 of the ribs 150, the load-displacement rate begins to increase, greater than if the elastomeric compression spring 110 did not have ribs 150, due to the increasing thickness (T) of the tube 112 along a first portion of the ribs 150. The load-displacement rate continuously increases in this manner under further compression of the elastomeric compression spring 110 until the displacement of the elastomeric compression spring 110 reaches some point (e.g., midpoint) between the displacement A and a displacement B, at which time the load-displacement rate starts to decrease.

Figure 12:
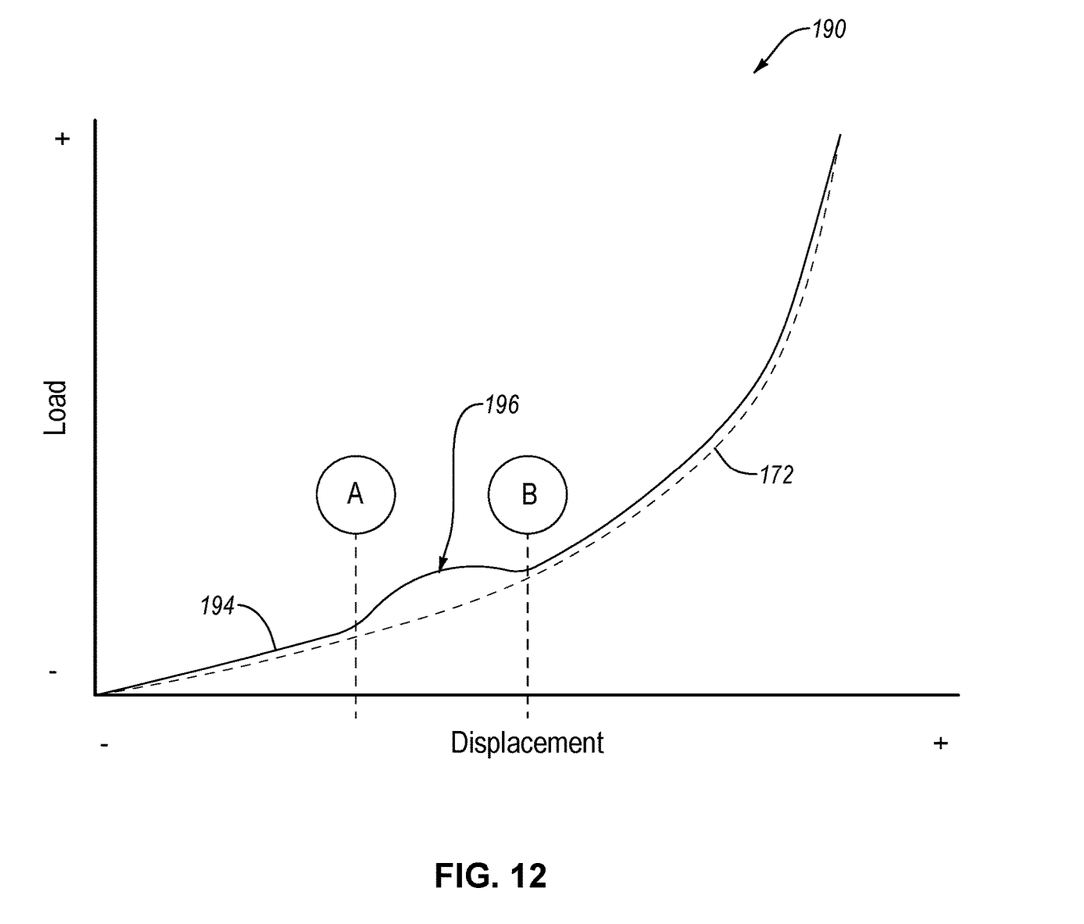
FIG. 12 is a chart showing a load-displacement performance of the elastomeric compression spring of FIG. 8, according to one or more examples of the present disclosure.

Displacement B corresponds with the displacement of the elastomeric compression spring 110 where the first part comes in contact with the trailing edges 154 of the ribs 150. The region of the load-displacement curve 194 between the displacement A and the displacement B is defined as a localized load-displacement increase region 196. At displacement B, the load-displacement curve 194 starts to align with the load-displacement curve 172 of the elastomeric compression spring 110 without the ribs 150. Accordingly, the localized load-displacement increase region 196 acts a localized departure from the load-displacement curve 172.

The characteristics of the localized load-displacement increase region 196 are based on the configuration of the ribs 150. For example, the depth (D) of the ribs 150 corresponds with a magnitude of increase in the load-displacement rate of the elastomeric compression spring 110 within the localized load-displacement increase region 196. The circumferential distance (d) of the ribs 150 away from the initial contact line 136 corresponds with the displacement of the tube 112 at which the increase in the load-displacement rate of the elastomeric compression spring 110 begins. In other words, the circumferential distance (d) of the ribs 150 away from the initial contact line 136 corresponds with displacement A of the load-displacement curve 174. The length (L) of the ribs 150 corresponds with the range of displacement of the tube 112 during which the load-displacement rate increases and departs from the load-displacement curve 172.

Any one of the characteristics of the ribs 150 can be modified to predictably and precisely adjust the characteristics of the load-displacement behavior of the elastomeric compression spring 110 in a manner similar to that described above in relation to the grooves 120. The direct correlation between the characteristics of the ribs 150 and the characteristics of the localized load-displacement increase region 196 allows the ribs 150 to be pre-designed and manufactured to predictably and precisely tune the load-displacement behavior of an elastomeric compression spring 110 to achieve a load-displacement increase region 196 with desired characteristics, including a desired location, magnitude, and duration.

Figure 13:
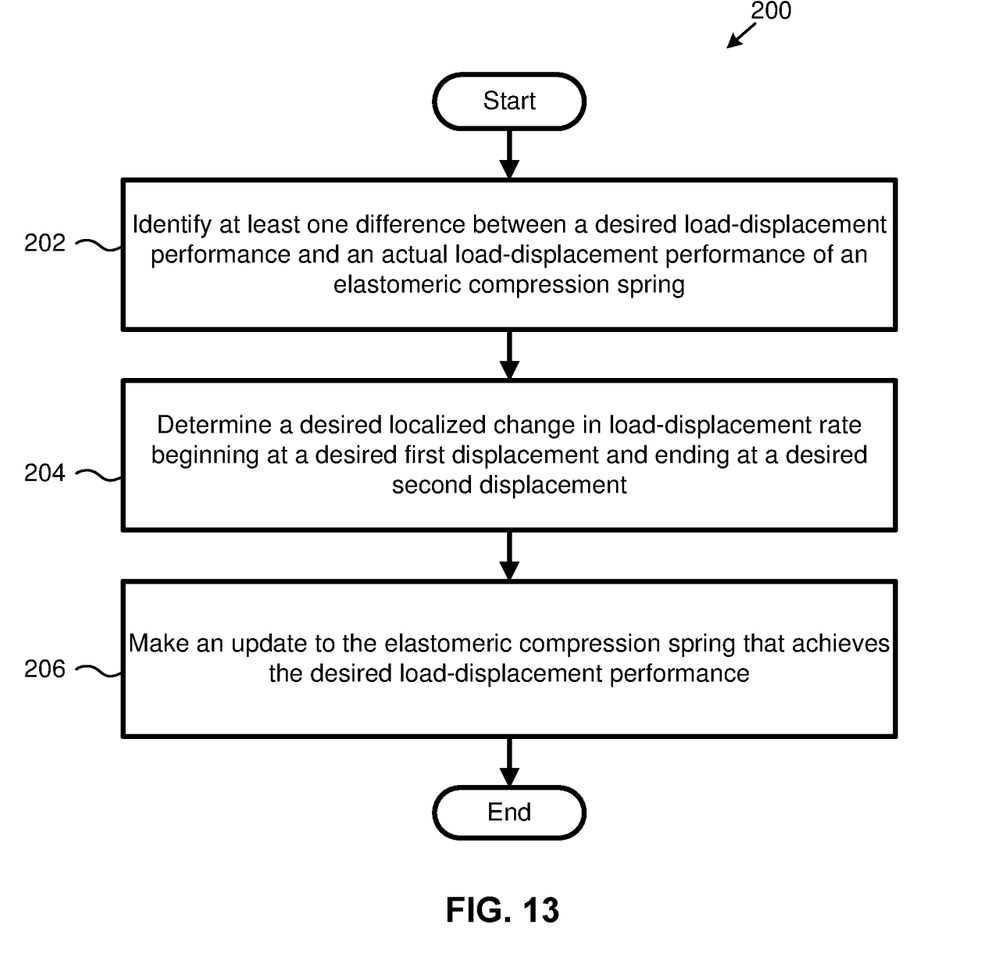
FIG. 13 is a schematic flow chart of a method of tuning an elastomeric compression spring, according to one or more examples of the present disclosure.

Referring to FIG. 13, according to one example, a method 200 of tuning an elastomeric compression spring 110 includes identifying at least one difference between a desired load-displacement performance and an actual load-displacement performance of an elastomeric compression spring at 202. The method 200 further includes determining a desired localized change (e.g., bump) in load-displacement rate beginning at a desired first displacement and ending at a desired second displacement corresponding with the at least one difference between the desired load-displacement performance and the actual load-displacement performance at 204. The method 200 also includes making an update to an elastomeric compression spring that achieves the desired load-displacement performance at 204.

In some implementations, the localized change in the load-displacement rate is a localized decrease (e.g., bump decrease) in the load-displacement rate. Moreover, the update to the elastomeric compression spring in step 206 of the method 200 includes updating at least one groove 120 formed in the outer surface 117 of the elastomeric compression spring 100. The groove 120 is configured such that a depth (D) of the groove 120 corresponds with a magnitude of the localized decrease in the load-displacement rate, a circumferential distance (d) of the groove 120 away from the initial contact line 136 of the tube 112 corresponds with the desired first displacement, and a length (L) of the groove 120 corresponds with the desired second displacement.

In other implementations, the localized change in the load-displacement rate is a localized increase (e.g., bump increase) in the load-displacement rate. Moreover, the update to the elastomeric compression spring in step 206 of the method 200 includes updating at least one rib 150 formed in the outer surface 117 of the elastomeric compression spring 110. The rib 150 is configured such that a height (h) of the rib 150 corresponds with a magnitude of the localized increase in the load-displacement rate, a circumferential distance (d) of the rib 150 away from the initial contact line 136 of the tube 112 corresponds with the desired first displacement, and a length (L) of the rib 150 corresponds with the desired second displacement.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. An elastomeric compression spring for isolating vibrations between a first part and a second part, wherein the first part is movable in a direction relative to the second part, the elastomeric compression spring comprising:
    a tube elongated along a central axis of the tube, wherein:
        the central axis of the tube is perpendicular to the direction;
        the tube is configured to compress in the direction;
        the tube comprises an outer surface comprising an initial contact line configured to initially receive contact from the first part;
        the tube further comprises a plurality of ribs formed in the outer surface, parallel to the central axis, and circumferentially spaced apart from the initial contact line, such that at least one rib of the plurality of ribs is formed on opposite sides of the initial contact line; and
        each one of the plurality of ribs creates a localized increase in a thickness of the tube and a stiffness of the elastomeric compression spring at each one of the plurality of ribs;
    wherein:
        the thickness of the tube, radially inwardly from the initial contact line, has a first thickness; and
        the thickness of the tube, radially inwardly from a highest portion of each one of the plurality of ribs, has a second thickness;
        the first thickness is less than the second thickness.

2. The elastomeric compression spring according to claim 1, wherein the plurality of ribs comprises two ribs formed in the outer surface of the tube on opposite sides of the initial contact line.

3. The elastomeric compression spring according to claim 2, wherein the two ribs are circumferentially spaced a same distance from the initial contact line.

4. The elastomeric compression spring according to claim 2, wherein:
    the plurality of ribs comprises four ribs formed in the outer surface of the tube; and
    two of the four ribs are on a side of the initial contact line opposite that of the other two of the four ribs.

5. The elastomeric compression spring according to claim 1, wherein:
    the outer surface of the tube has a curved convex shape; and
    each one of the plurality of ribs have a curved convex shape with a radius of curvature less than that of the curved convex shape of the outer surface of the tube.

6. The elastomeric compression spring according to claim 1, wherein the tube is made of a thermoplastic elastomer.

7. The elastomeric compression spring according to claim 1, wherein the thickness of the tube, when moving along the tube in a circumferential direction toward the initial contact line, increases and decreases along the at least one rib.

8. The elastomeric compression spring according to claim 1, wherein:
    a height of each one of the plurality of ribs corresponds with a magnitude of increase in a load-displacement rate of the elastomeric compression spring;
    a length of each one of the plurality of ribs corresponds with a range of displacement of the tube during which the load-displacement rate is increased; and
    a circumferential distance of each one of the plurality of ribs away from the initial contact line corresponds with a displacement of the tube at which the increase in the load-displacement rate of the elastomeric compression spring begins.

9. The elastomeric compression spring according to claim 1, wherein:
    the tube further comprises an inner surface that is opposite the outer surface and separated from the outer surface by the thickness of the tube;
    the inner surface defines a hollow interior channel; and
    a cross-sectional shape of the hollow interior channel is circular.

10. The elastomeric compression spring according to claim 1, wherein:
    the tube further comprises an inner surface that is opposite the outer surface and separated from the outer surface by the thickness of the tube; and
    an entirety of the inner surface is concave.

11. The elastomeric compression spring according to claim 1, further comprising:
    a base coupled to the tube; and
    a radius portion, at least partially formed in the outer surface of the tube, at each of two intersections between the base and the tube.

12. The elastomeric compression spring according to claim 11, wherein:
    the base and the tube are co-formed together to collectively form a one-piece, seamless monolithic construction; and
    the radius portion is at least partially formed in the base.

13. The elastomeric compression spring according to claim 1, wherein, excluding a thickness of the tube along each one of the plurality of ribs, the thickness of the tube varies in a circumferential direction along the tube.

14. The elastomeric compression spring according to claim 13, wherein:
    a thickness of the tube, radially inwardly from an opposite side of a first one of the plurality of ribs than the initial contact line, has a third thickness; and
    the third thickness is greater than the first thickness.

15. The elastomeric compression spring according to claim 1, wherein the outer surface of the tube is convex about more than half a circumference of the tube.

16. The elastomeric compression spring according to claim 4, wherein the four ribs are located on an upper half of the tube.

17. The elastomeric compression spring according to claim 1, wherein each one of the plurality of ribs has a cross-sectional shape with a constant radius of curvature.

18. The elastomeric compression spring according to claim 1, wherein each one of the plurality of ribs has cross-sectional shape with a changing radius of curvature.

19. A method of tuning an elastomeric compression spring, the method comprising:
providing an elastomeric compression spring for isolating vibrations between a first part and a second part, wherein the first part is movable in a direction relative to the second part, the elastomeric compression spring comprising:
a tube elongated along a central axis of the tube, wherein:
the central axis of the tube is perpendicular to the direction;
the tube is configured to compress in the direction;
the tube comprises an outer surface comprising an initial contact line configured to initially receive contact from the first part;
the tube further comprises a plurality of ribs formed in the outer surface, parallel to the central axis, and circumferentially spaced apart from the initial contact line, such that at least one rib of the plurality of ribs is formed on opposite sides of the initial contact line; and
each one of the plurality of ribs creates a localized increase in a thickness of the tube and a stiffness of the elastomeric compression spring at each one of the plurality of ribs;
wherein:
the thickness of the tube, radially inwardly from the initial contact line, has a first thickness; and
the thickness of the tube, radially inwardly from a highest portion of each one of the plurality of ribs, has a second thickness;
the first thickness is less than the second thickness;
identifying at least one difference between a desired load-displacement performance and an actual load-displacement performance of an elastomeric compression spring;
determining a desired localized increase in a load-displacement rate beginning at a desired first displacement and ending at a desired second displacement corresponding with the at least one difference between the desired load-displacement performance and the actual load-displacement performance; and
updating each one of the plurality of ribs formed in an outer surface of a tube of the elastomeric compression spring, according to the desired localized increase in the load-displacement rate, to achieve the desired load-displacement performance.

20. The method according to claim 19, wherein the elastomeric compression spring is updated such that:
a height of each one of the plurality of ribs corresponds with a magnitude of the desired localized increase in the load-displacement rate;
a circumferential distance of each one of the plurality of ribs away from an initial contact line of the tube corresponds with the desired first displacement; and
a length of each one of the plurality of ribs corresponds with the desired second displacement.

* * * * *